F. G. BAKES.
Side-Hill Plow.
No. 60,820.
Patented Jan. 1, 1867.
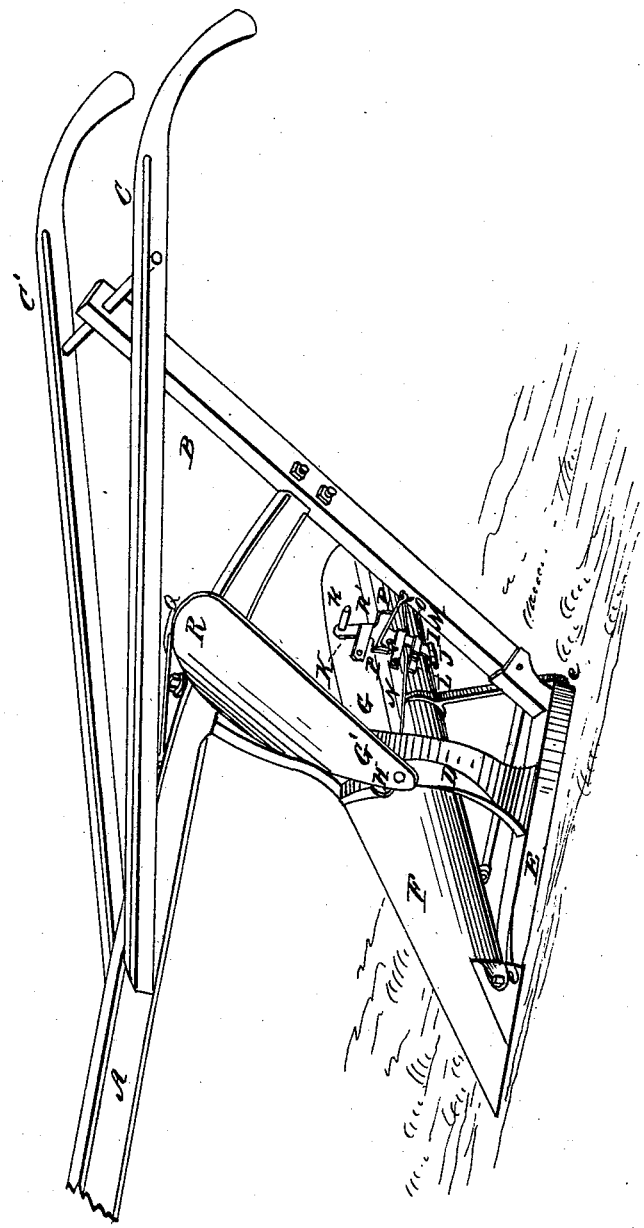
Witnesses:
Inventor:

United States Patent Office.

FREDERICK G. BAKES, OF VEVAY, INDIANA.

Letters Patent No. 60,820, dated January 1, 1867.

---

IMPROVEMENT IN HILLSIDE PLOUGHS.

---

*The Schedule referred to in these Letters Patent and making part of the same.*

---

TO WHOM IT MAY CONCERN:

Be it known that I, FREDERICK G. BAKES, of Vevay, Switzerland county, Indiana, have invented a new and useful Improvement in Hillside Ploughs; and I do hereby declare the following to be a full, clear, and exact description thereof, reference being had to the accompanying drawing, making a part of this specification.

This is an improvement in form of hillside plough, which has a reversible share, and consists in the provision of a pair of wings or mould-boards one on each side of the plough, adapted to form alternately an upward continuation of the share, so as to render the implement more effective in turning the furrow slice.

The following parts may be substantially the same as in other reversible hillsides, to wit:

The beam A, stilt B, handles C C', sheath D, landside bar E, to whose ends the reversible share F is pivoted at $e$ and $e'$, respectively. The reversible share, from its necessarily narrow breadth at its rear end, has been inefficient as a sod turner, and to remedy this defect I have provided precisely similar wings or mould-boards, G G'. Each wing is similarly curved, so as to form a continuation of the share. A pivot, H, passing through the forward end of each wing, secures it to the sheath, and permits it to be brought down to contact with the share, as at G, or to be elevated to the inactive position shown at G'. Hinged, I, to the revolving pivot J, on the under side of the share, at the mid-width thereof, is a latch, K, curved to fit the concavity of the share and wing. Lugs, L L', on the under side of the share, and lugs, M M', on the under side of the wing, receive the latch K, and act in conjunction with said latch to preserve the relative positions and continuity of the share and wing, the latch being thus made to perform the function of a cleat. $k$ is a handle, which projects from the free end of the latch. An eye, N, upon the under side of the wing, receives a hook, O, from the stilt, which serves to hold both the share and that particular wing in the desired right or left position for ploughing. The same hook, by engaging behind one of two lips, P P', prevents the escape of the latch until released by the withdrawal of the hook. When the right-hand share is thus secured for work, the left share is swung to the upward or inactive position shown at G', and secured thereto by a hook, Q, extending from the beam and engaging in an eye, R, on the under side of the wing near its rear end. On the reversal of the share the previously active wing is in turn secured to its upper or inactive position, and the other wing latched fast to the edge of the share.

I claim herein as new and of my invention—

1. The provision in a hillside plough of right and left wings or mould-boards G G', adapted to be alternatively secured in the active and inactive positions, substantially as set forth.

2. In the described combination with the reversible share F and wings G G', I claim the latch K, lips P, lugs L L', M M', eye N, and hook, O, or their mechanical equivalents, for the purpose explained.

3. The arrangement of duplicated wings, G G', pivoted near their front ends to the sheath, and secured alternatively to their upper or inactive positions by the hook Q and eye R, or their equivalents.

In testimony of which invention I hereunto set my hand.

FREDERICK G. BAKES.

Witnesses:
GEO. H. KNIGHT,
LEWIS F. WORKS.